June 6, 1939.    H. R. GALLUN ET AL    2,161,153
DUAL TRANSMISSION CONTROL MECHANISM
Filed May 8, 1937    3 Sheets-Sheet 1
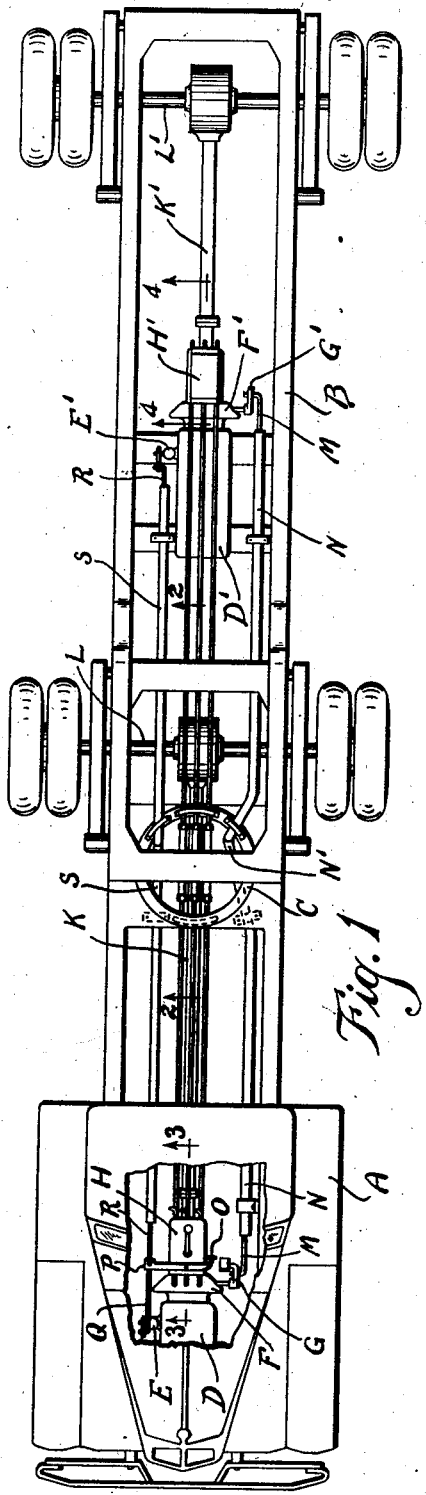
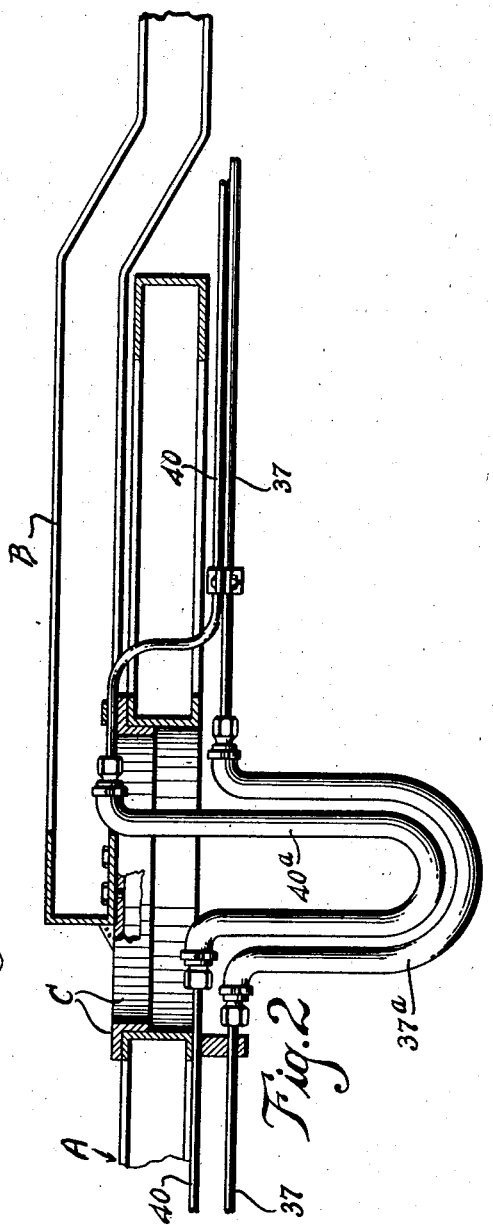
INVENTORS
Hugo R. Gallun & Grover S. Waddell
BY
Edwin D. Jones.
ATTORNEY.

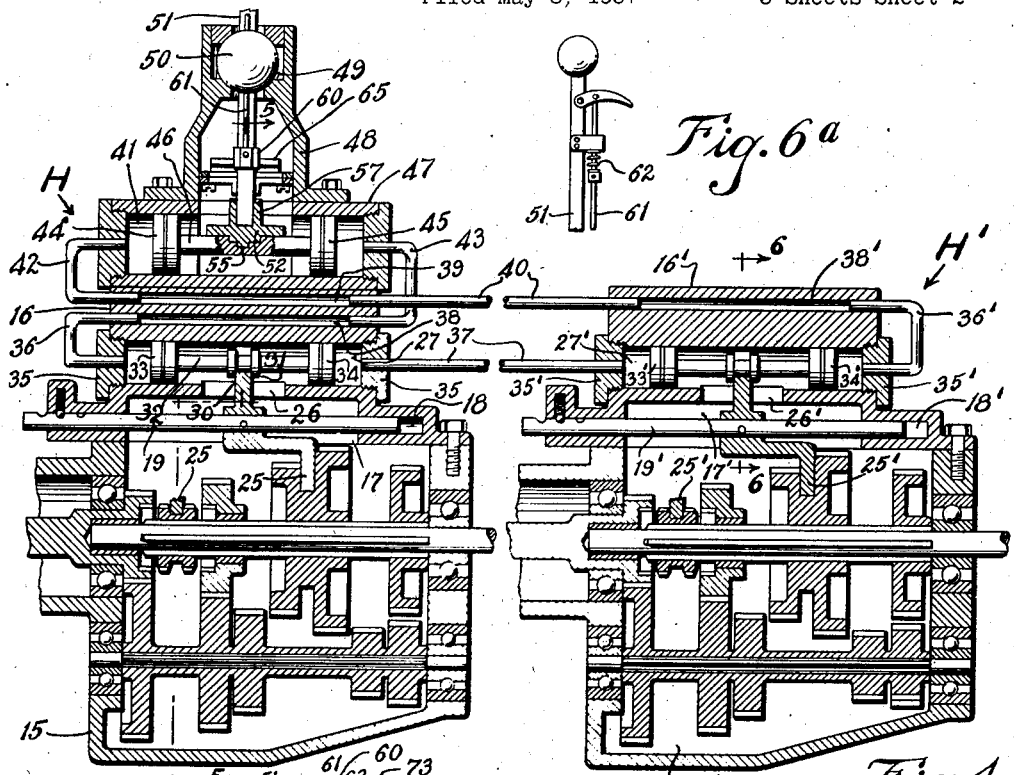

June 6, 1939.  H. R. GALLUN ET AL  2,161,153
DUAL TRANSMISSION CONTROL MECHANISM
Filed May 8, 1937   3 Sheets-Sheet 3
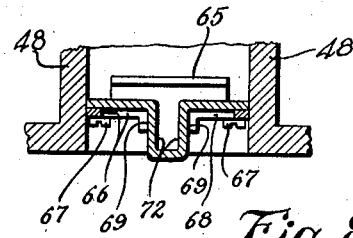
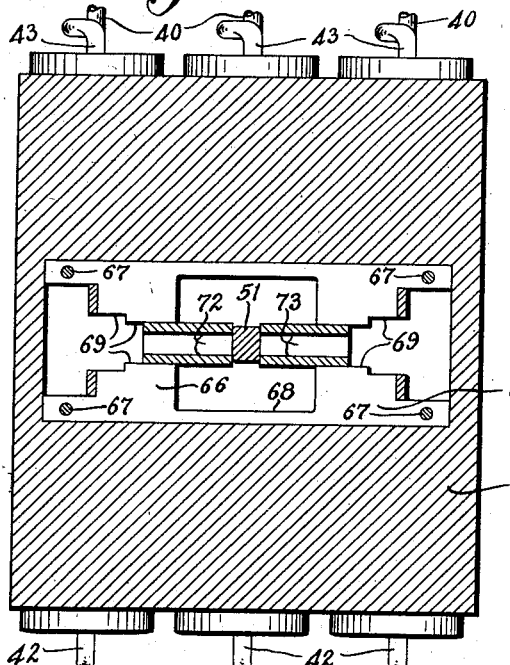
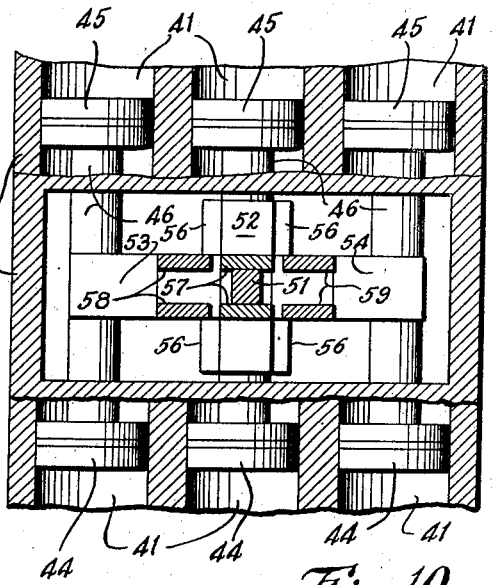
INVENTORS
Hugo R. Gallun & Grover S. Waddell
BY
Edwin D. Jones.
ATTORNEY.

Patented June 6, 1939

2,161,153

UNITED STATES PATENT OFFICE 2,161,153

DUAL TRANSMISSION CONTROL MECHANISM

Hugo R. Gallun and Grover S. Waddell, Los Angeles, Calif.; said Gallun assignor to said Waddell Application May 8, 1937, Serial No. 141,475

11 Claims. (Cl. 180—14)

Our invention relates to motor vehicle combinations embodying automotive trucks with trailers or semi-trailers, and it has for a purpose the provision of a motor for the trailer or semi-trailer in addition to the usual motor of a truck whereby, through the combined power produced by both motors, with only the added weight of the trailer motor and its appurtenances, the vehicle combination is rendered capable of transporting loads of much greater poundage per horse power than is possible with the use of a truck motor alone.

It is also a purpose of our invention to provide in a dual motor combination as above described, a selective gear transmission for each motor with a control mechanism common to both transmissions whereby, the same driving speed or gear ratio of the two transmissions can be selected simultaneously by the truck operator, to cause the two motors to properly combine in providing the augmented propulsion for the truck and its trailer.

A further purpose of our invention is the provision of a dual transmission control mechanism which embodies gear shift rods and hydraulic motors one for each shift rod, and liquid pressure pumps, one for each hydraulic motor to actuate the same for shifting the respective shift rod.

Another purpose of our invention is the provision of a control mechanism as above characterized wherein the liquid pressure pumps are selectively operable by a single manually actuated lever, with a device operable by movement of the lever to lock all of the pumps, except the one selected for operation, and to thus prevent accidental operation of the unselected pumps as a result of expansion of the liquid in the pumps, in the hydraulic motors, or in the lines connecting the two, and to thereby eliminate the possibility in each transmission of more than one gear being shifted at any one time and the resultant destruction of the gears.

We will describe only one form of control mechanism embodying our invention in association with the transmission of a truck and the transmission of a semi-trailer, and will then point out the novel features thereof in claims.

In the accompanying drawings:

Fig. 1 is a view showing in top plan automotive truck and semi-trailer, the latter being provided with a motor and transmission, and having applied to the two transmissions one form of control mechanism therefor embodying our invention.

Fig. 2 is an enlarged fragmentary sectional view taken on the line 2—2 of Fig. 1.

Fig. 3 is an enlarged sectional view taken on line 3—3 of Fig. 1.

Fig. 4 is a view similar to Fig. 3 taken on the line 4—4 of Fig. 1.

Fig. 5 is a vertical sectional view taken on the line 5—5 of Fig. 3.

Fig. 6 is a vertical sectional view taken on the line 6—6 of Fig. 4.

Fig. 6ª is a fragmentary view of the operating lever.

Fig. 7 is an enlarged horizontal sectional view taken on the line 7—7 of Fig. 5.

Fig. 8 is a vertical sectional view taken on the line 8—8 of Fig. 7.

Fig. 9 is a view similar to Fig. 7 taken on the line 9—9 of Fig. 5.

Fig. 10 is a view similar to Fig. 9 taken on the line 10—10 of Fig. 5.

Referring to Figs. 1 and 2, a conventional form of four-wheeled truck A is shown and to which is connected a semi-trailer B by means of a conventional form of fifth wheel C. The truck A is provided with a motor D, a carburator E, a clutch F operable by a clutch pedal G, and a transmission H of the selective sliding gear type. As will be understood, the transmission transmits power from the motor D through a driving shaft K to the rear axle L of the truck.

On the semi-trailer B is carried a motor D' with a carburator E', and through a clutch F' the motor is operatively connected to a transmission H' likewise of the selective sliding gear type. Through a driving shaft K' the transmission H' drives the rear axle L' of the semi-trailer.

As shown in Fig. 1, the clutch pedal G is operatively connected to an operating arm G' for the clutch F' in such manner that, through operation of the pedal G, both clutches F and F' can be simultaneously operated. In the present instance, the connection between the pedal G and the arm G' comprises a flexible rod M extending through rigid pipes N and a flexible pipe N', the latter connecting the pipes N and associated with the fifth wheel C to allow relative movement of the pipes N, as will be understood.

Again referring to Fig. 1, the throttle valves of the carburetor E and E' are operatively connected to permit simultaneous adjustment thereof through actuation of an accelerator pedal O on a lever P operatively connected to the throttle valves through rods Q and R. The rod Q is connected to the throttle valve for the carburetor E, while the rod R is flexible, extends through tubes S and is connected to the valve for the carburetor E'. The intermediate tube is flexible and associated with the fifth wheel C to permit relative movement of the other two tubes, as will be understood.

For shifting the gears of the transmission H' simultaneously with shifting of the gears of the transmission H and in such manner that the same gears of the two transmissions are selected and shifted to obtain the same gear ratio in both transmissions, we provide the following hydraulically operated control mechanism.

As shown in Figs. 3, 5, and 6 the gear box 15 for the transmission H is provided with a specially constructed covering in the form of a block 16 formed with a bottom recess 17 and openings 18 in which latter are received the rods for shifting the gears of the transmission. The transmission here shown provides four forward speeds and one reverse as is customary in transmissions for automotive trucks, and hence, there are three shift rods 19, 20 and 21. The central shift rod 19 is operable to select the first and second speed gears according as such rod is moved to the right or the left from the intermediate or neutral position shown in Fig. 3. The shift rod 20 is movable in the same manner as the rod 19 to select the third and fourth speed gears of the transmission, while the rod 21 is movable only to the left from an intermediate position to select the reverse gear of the transmission.

As best shown in Figs. 5 and 6 the rods 19, 20 and 21 have keyed thereto yokes 22, 23 and 24, respectively, with forks 25 at the lower ends engaging the respective gears of the transmission. The yokes are constructed to extend upwardly from the shift rods through suitable slots 26 in the block 16 and into cylinders 27, 28 and 29, respectively formed in the block, where they are provided with forks 30. These forks engage between collars 31 on piston rods 32.

As best shown in Fig. 3 each piston rod 32 is provided with two piston heads 33 and 34 and the piston as a unit is movable in the respective cylinder 27, 28 or 29 to actuate the respective shift rod in the shifting of the gears, the yoke and its forks providing the operative connection, as will be understood.

Each cylinder and its respective piston constitutes a hydraulic motor, and to each cylinder liquid under pressure is adapted to be supplied to either end of the cylinder for moving the piston in one direction or the other for operation of the respective shift rod.

As shown in Fig. 4, the transmission H' is identical to the transmission H, that is, the gear arrangement is such as to provide four speeds forward and one reverse. Similarly, the block on the gear box, the shift rods, the hydraulic motors, and the connections between the piston rods of such motors and the shift rods are all identical. Hence, the same reference numerals have been employed to designate corresponding parts, except the reference numerals have been primed.

As shown in Figs. 3 and 4, each motor cylinder 27, 28 and 29 is closed at its ends by heads 35 into which extend, respectively, pipes 36 and 37, and the pipes 37 extend rearwardly from these cylinders into the forward ends of the respective cylinders 27', 28', and 29' of the hydraulic motors for the transmission H'. The pipes 36 and 36' extend into conduits 38 and 38', respectively, formed in the blocks 16 and 16', respectively. Another conduit 39 is formed in the block 16 for the respective hydraulic motor, and this conduit communicates with the corresponding conduit 38' through a tube 40. The other end of the conduit 39 communicates with one end of a cylinder 41 of a pump through a tube 42, and the opposite end of the same cylinder is in communication with the conduit 38 through a tube 43. As best shown in Fig. 2, each pipe 37 and 40 is in two parts connected by flexible hose 37ª and 40ª associated with the fifth wheel C so as to allow relative movement of the pipe parts, as will be understood.

As there are three hydraulic motors, three pumps are provided one for each of the motors, in order that each shift rod may be actuated independently of the others. The cylinders 41 of the pumps are in effect double cylinders, one for each of a pair of pistons 44 and 45 connected by a rod 46 exposed between the cylinders, as best shown in Fig. 10. The casting 47 in which the cylinders 41 are formed, is suitably secured upon the block 16 (Fig. 5), while bolted on this casting is a frame 48. This frame 48 is constructed to provide a socket 49 in which a ball 50 is received and formed on an operating lever 51, this ball and socket mounting permitting universal movement of the lever in the manner of the conventional gear shifting lever.

The lever 51 is manually movable to selectively actuate any one of the pumps through the provision of yokes 52, 53 and 54, one for each of the piston rods 46. The yokes are fixed to the respective piston rods by pins 55, and they are movable relatively to permit operation of the piston for one cylinder independently of those of the other cylinders through tongue and groove connections 56 between the outer yokes 53 and 54 and the inner yoke 52. The three yokes are provided with upstanding forks 57, 58 and 59, respectively, and into any of these forks the lower end of the operating lever 51 is adapted to engage so that upon movement of the lever forwardly or rearwardly from a neutral position, corresponding movement of the respective piston rod can be effected.

The operation of the control mechanism is as follows: Let it be assumed that the pump cylinders, the motor cylinders, and the conduits and pipes are all filled with a suitable liquid. If it is desired to control the two transmissions H and H' so as to obtain first or second gear speed, the lever 51 when in the central position shown in Figs. 3 and 5, wherein it engages the fork 57 of the center piston rod 46, is moved to the right or left from a neutral or intermediate position as when viewed in Fig. 3. Such movement of the piston causes one piston head 44 or 45 to displace the liquid from the respective end of the cylinder and to thereby build up a pressure on the liquid in the opposite end of the motor cylinders 27 and 27'. The liquid pressure thus generated moves the pistons in the cylinders 27 and 27' to shift the rods 19 and 19' and the gears connected thereto, to obtain first or second speed in both transmissions.

Because the pump and motor pistons are, in each instance, formed with two piston heads, movement of any one piston causes one head to displace liquid from one end of the cylinder and the other head to induce liquid into the other end of the cylinder. Thus, by connecting the motor cylinders of both transmissions with each other and with the pump cylinders, as illustrated, the liquid pressure created by movement of the pump piston in either direction is effective to simultaneously move the motor pistons for both transmissions in one direction or the other depending upon the direction of movement of the pump piston. Manifestly, by restoring the pump piston to an intermediate position through return of the lever to a perpendicular or neutral position the gears can be disengaged to permit the selection of other speeds.

From the preceding operation of one pump and one hydraulic motor to secure first and second speeds in the two transmissions, it will be clear that third and fourth speeds in both transmissions may be obtained by laterally shifting the lever 51 to engage the fork 58 and then actuating the lever in the same manner to move the shift rod 20 and thereby select either speed gear depending upon in which direction the lever is moved from its neutral or intermediate position.

Similarly, reverse gear in both transmissions can be obtained simultaneously by moving the lever 51 laterally to engage the fork 59 and then forwardly or toward the observer, as when viewed in Fig. 5, to actuate the shift rods 21 and 21'. Here, as in conventional sliding gear transmissions, there is only one reverse speed for each transmission, and, therefore, it is only necessary to advance and retract the lever to cause the reverse gears (not shown) to become active or inactive. In order to prevent the lever and the respective shift rod 32 being moved rearwardly from a neutral position or to normally prevent accidental shifting of the lever 51 into engagement with the fork 59, the following device is provided.

A collar 60 is slidable vertically on the lever 51 (Figs. 3, 5 and 7) and by means of a rod 61 urged downwardly by a spring 62 (Fig. 6ª) the collar normally occupies a lowered position in which it is adapted to abut a lip 63 to prevent shifting of the lever laterally to the right as when viewed in Fig. 7. However, by elevation of the collar to clear the lip through lifting of the rod against the tension of the spring, the lever can be laterally moved to engage the fork 59 and actuate the shift rod 46. Because of its location the lip only permits the lever to be moved forwardly, the lever abutting the lip when in neutral position.

This lip 63 is formed on one of a pair of L-shaped flanges 64 and 65 of a frame 66 secured by screws 67 to the shouldered portion of the frame 48 (Fig. 5). As best shown in Figs. 7, 8 and 9, the frame is shaped to provide a central opening 68 and lateral slots 69, 69. On the upper side of the frame 66 and in overlying relation to the opening 68, is a plate 70 having a slot 71 from the side edges of which extend tongues 72 and 73. These tongues are slidable in the slots 69 to permit edgewise shifting of the plate on the frame 66, the flanges 64 and 65 limiting movement of the plate in either direction.

The frame 66 and the plate 70 constitute a safety device for locking two of the pump pistons while releasing the third for operation by the lever 51. This is for the purpose of preventing accidental operation of the pump or motor pistons as a result of expansion of the liquid in the pump cylinders, or in the motor cylinders, or in the lines connecting the two. Manifestly, in actual use of the control mechanism the liquid is subjected, at times, to relatively high temperatures to cause such expansion. Obviously if such accidental operation of any one pump or motor should occur while another pump or motor is in operation, the resultant engagement of transmission gears would destroy them.

In the application of the safety device to the control mechanism the operating lever 51 extends through the slot 71 which is sufficiently long to permit of the necessary movements of the lever in the actuation of the pump pistons. However, the width of the slot is such that to move the lever laterally in either direction from its central position or that position in which it engages the fork 57, and to cause it to engage either the fork 58 or 59, the plate 70 is shifted with the lever. In the position of the plate 70 with the lever in central position, the tongues 72 and 73 are between the arms of the forks 58 and 59 respectively. Thus, these forks are locked against movement to secure the respective pump rods 46 against movement.

However, when the plate is shifted from its central position to the left as when viewed in Fig. 5, the tongue 73 moves into the fork 57 while remaining in the fork 59, but the tongue 72 moves out of the fork 58. This allows free movement of the lever in the operation of the respective pump piston, but the pistons of the other two pumps are locked against movement. Conversely, when the plate 70 is shifted to the right from its central position, the tongue 72 moves into the fork 57 while remaining in the fork 58, but the tongue 73 moves clear of the fork 59. Thus, the lever is now free to actuate the pump piston to which the fork 58 is connected, but the other two pump pistons are locked against movement.

Manifestly, by the provision of a clutch control, a throttle valve, and a transmission control, each common to both the truck motor and the trailer motor, the truck operator can control both motors to secure simultaneous connection and disconnection thereof to or from the drive shafts, simultaneous motor acceleration and deceleration, and the same gear ratio in each transmission in order that the two motors may properly combine in providing the augmental propulsion to secure the desired increased load transporting capacity of the vehicle combination as a whole.

Although we have herein shown and described only one form of dual transmission control mechanism embodying our invention, it is to be understood that various changes and modifications may be made herein without departing from the spirit of our invention and the spirit and scope of the appended claims.

We claim:

1. In combination; a truck; a trailer connected to the truck; a pair of motors for independently propelling the truck and the trailer; selective gear transmissions, one for each of the motors; and hydraulic means common to both transmissions for simultaneously selecting the same gear ratio in both transmissions, and including manually operable means on one of said vehicles for creating hydraulic forces for actuating said transmissions.

2. In combination; a truck; a trailer connected to the truck; a pair of motors for independently propelling the truck and the trailer; selective gear transmissions, one for each of the motors; selective hydraulic gear-shifting means for each of the transmissions; and a manually operable pump means carried by one of said vehicles and operable thereon for selectively actuating gear-shifting means of both transmissions simultaneously.

3. In combination; at least two selective gear transmissions; selective hydraulic gear-shifting means for each of the transmissions; pumping means for selectively actuating the same gear-shifting means of the transmissions simultaneously; and means actuated by and effective through said pumping means to lock against operation all gear-shifting means of both transmissions except those actuated at any one time by said pumping means.

4. In combination; vehicular means, propulsion means therefor including two selective transmissions having gear-shifting rods; hydraulic motors for actuating the rods; hydraulic pumps each hydraulically connected to the motors for the corresponding rods of the two transmissions; and manually operable means for selectively actuating said pumps.

5. In combination; vehicular means, propulsion means therefor including two selective transmissions having gear-shifting rods; hydraulic motors for actuating the rods; hydraulic pumps each hydraulically connected to the motors for the corresponding rods of the two transmissions; manually operable means for selectively actuating said pumps; and means operable by said manually operable means for locking against operation those pumps unselected including members engaged and shifted by said manually operable means into and out of locking position.

6. In combination; vehicular means, propulsion means therefor including two selective transmissions having separate sets of gear-shifting rods; hydraulic motors one for each gear-shifting rod; hydraulic pumps one for the corresponding hydraulic motors for the corresponding gear-shifting rods of the two transmissions; liquid conducting connections between each pump and the corresponding motors for hydraulically connecting the motors in series with each other and with the pump; and a common actuator for all of said pumps movable to selectively actuate any one of the pumps.

7. A combination as embodied in claim 6 wherein each pump and each motor comprises a pair of cylinders and a pair of interconnected pistons one for each of the cylinders whereby liquid pressures can be supplied to the motor cylinders to move said rods in either direction.

8. In combination; vehicular means, propulsion means therefor including two selective transmissions having separate sets of gear-shifting rods; hydraulic motors one for each gear-shifting rod; hydraulic pumps one for the corresponding hydraulic motors for the corresponding gear-shifting rods of the two transmissions; liquid conducting connections between each pump and the corresponding motors for hydraulically connecting the motors in series with each other and with the pump; a common actuator for all of said pumps movable to selectively actuate any one of the pumps; and a device operable by movement of said actuator for simultaneously engaging and locking all pumps against operation except the one selected by the actuator.

9. A control mechanism for co-related power operated apparatus to which the actuating force is applied through the instrumentality of at least two selective gear transmissions having gear-shift rods, comprising; hydraulic motors one for each gear-shift rod for each transmission; hydraulic pumps one for the corresponding hydraulic motors for the corresponding gear-shift rods of the two transmissions; and actuator means initially movable to simultaneously select a pump for operation and to engage and lock against movement the unselected pumps, and finally movable to operate the selected pump actuating said pumps.

10. A control mechanism for separately driven co-related mechanisms to which operating forces are applied through at least two selective gear transmissions having gear-shift rods, comprising; hydraulic motors one for each gear-shift rod for each transmission; hydraulic pumps one for the corresponding hydraulic motors for the corresponding gear-shift rods of the two transmissions; a common actuator initially manually movable to select a pump for operation and then movable for selectively actuating said pumps; and a locking device operable by and upon said initial movement of said actuator for releasing the selected pump and engaging and locking together against operation the unselected pumps.

11. In combination; at least two selective gear transmissions; selective hydraulic gear-shifting means for each of the transmissions; and selective pumping means, all of said means being hydraulically connected in series so that by selectively actuating the pumping means the same gear-shifting means of the two transmissions will be actuated simultaneously.

GROVER S. WADDELL.
HUGO R. GALLUN.